United States Patent
Kim et al.

(10) Patent No.: US 8,942,153 B2
(45) Date of Patent: Jan. 27, 2015

(54) METHOD FOR TRANSMITTING AND RECEIVING DATA USING A PLURALITY OF CARRIERS

(75) Inventors: Hak Seong Kim, Seoul (KR); Bong Hoe Kim, Gyeonggi-do (KR); Joon Kui Ahn, Seoul (KR); Dong Youn Seo, Seoul (KR); Dong Wook Roh, Seoul (KR); Jung Hoon Lee, Seoul (KR)

(73) Assignee: LG Electronics Inc., Seoul (KR)

(*) Notice: Subject to any disclaimer, the term of this patent is extended or adjusted under 35 U.S.C. 154(b) by 1685 days.

(21) Appl. No.: 12/088,637

(22) PCT Filed: Sep. 29, 2006

(86) PCT No.: PCT/KR2006/003936
§ 371 (c)(1),
(2), (4) Date: Sep. 5, 2008

(87) PCT Pub. No.: WO2007/037657
PCT Pub. Date: Apr. 5, 2007

(65) Prior Publication Data
US 2009/0316614 A1 Dec. 24, 2009

Related U.S. Application Data

(60) Provisional application No. 60/722,539, filed on Sep. 30, 2005.

(30) Foreign Application Priority Data

| Oct. 31, 2005 | (KR) | ........................ 10-2005-0103503 |
| Nov. 29, 2005 | (KR) | ........................ 10-2005-0114753 |
| Mar. 7, 2006 | (KR) | ........................ 10-2006-0021340 |

(51) Int. Cl.
*H04H 20/71* (2008.01)
*H04L 5/00* (2006.01)
(Continued)

(52) U.S. Cl.
CPC ............ *H04L 5/0048* (2013.01); *H04B 7/2615* (2013.01); *H04L 5/0007* (2013.01); *H04L 25/0226* (2013.01); *H04L 27/2607* (2013.01); *H04L 5/0044* (2013.01); *H04W 4/06* (2013.01)
USPC ............ 370/312; 370/390; 370/338; 370/432

(58) Field of Classification Search
None
See application file for complete search history.

(56) References Cited

U.S. PATENT DOCUMENTS 2,919,308 A * 12/1959 Cooke ........................... 370/537
4,696,052 A * 9/1987 Breeden ........................ 455/503

(Continued)

FOREIGN PATENT DOCUMENTS

| CN | 1491011 | 4/2004 |
| CN | 1160887 | 8/2004 |

(Continued)

OTHER PUBLICATIONS

Lau, H.K. et al. "A pilot symbol-aided technique used for digital signal in mulipath environments." May 1994.

(Continued)

*Primary Examiner* — Ian N Moore
*Assistant Examiner* — Dung B Huynh
(74) *Attorney, Agent, or Firm* — Lee, Hong, Degerman, Kang & Waimey

(57) ABSTRACT

Methods for transmitting and receiving data using a plurality of carriers are disclosed. One of the methods comprises multiplexing the multicast/broadcast data and the unicast data in a frame and attaching a pilot signal to the frame. Another of the methods comprises receiving the radio frame including a plurality of data symbols multiplexed multicast/broadcast data with unicast data and retrieving the multicast/broadcast data and the unicast data from the radio frame.

3 Claims, 14 Drawing Sheets

(51) Int. Cl.
*H04B 7/26* (2006.01)
*H04L 25/02* (2006.01)
*H04L 27/26* (2006.01)
*H04W 4/06* (2009.01)

(56) References Cited

U.S. PATENT DOCUMENTS

| | | | | |
|---|---|---|---|---|
| 4,972,410 | A * | 11/1990 | Cohen et al. | 370/350 |
| 5,319,673 | A * | 6/1994 | Briskman | 455/13.1 |
| 5,412,416 | A * | 5/1995 | Nemirofsky | 725/36 |
| 6,005,605 | A * | 12/1999 | Kostreski et al. | 348/21 |
| 6,115,667 | A * | 9/2000 | Nakamura | 701/451 |
| 6,289,000 | B1 * | 9/2001 | Yonge, III | 370/203 |
| 6,700,919 | B1 * | 3/2004 | Papasakellariou | 375/130 |
| 6,731,936 | B2 * | 5/2004 | Chen et al. | 455/437 |
| 6,795,488 | B1 * | 9/2004 | Iwakiri | 375/148 |
| 6,839,024 | B2 * | 1/2005 | Spilker et al. | 342/386 |
| 6,839,337 | B2 * | 1/2005 | Newberg et al. | 370/338 |
| 6,950,624 | B2 * | 9/2005 | Kim et al. | 455/3.01 |
| 7,054,592 | B2 * | 5/2006 | Tatsumi et al. | 455/3.06 |
| 7,308,278 | B2 * | 12/2007 | Park | 455/503 |
| 7,423,984 | B2 * | 9/2008 | Hasegawa et al. | 370/282 |
| 7,522,514 | B2 * | 4/2009 | Tzannes et al. | 370/210 |
| 7,561,880 | B2 * | 7/2009 | Moon et al. | 455/436 |
| 7,564,775 | B2 * | 7/2009 | Jayaraman et al. | 370/208 |
| 7,587,219 | B2 * | 9/2009 | Bottomley et al. | 455/522 |
| 7,599,655 | B2 * | 10/2009 | Agashe et al. | 455/3.01 |
| 7,606,205 | B2 * | 10/2009 | Ranta-Aho et al. | 370/335 |
| 7,729,304 | B2 * | 6/2010 | Lee et al. | 370/328 |
| 7,734,257 | B2 * | 6/2010 | Chen et al. | 455/69 |
| 7,764,964 | B2 * | 7/2010 | Moon et al. | 455/436 |
| 7,769,050 | B2 * | 8/2010 | Scherzer et al. | 370/480 |
| 7,813,261 | B2 * | 10/2010 | Ma et al. | 370/203 |
| 7,894,818 | B2 * | 2/2011 | Khan | 455/450 |
| 7,948,907 | B2 * | 5/2011 | Wang et al. | 370/252 |
| 8,014,264 | B2 * | 9/2011 | Li et al. | 370/203 |
| 8,027,372 | B2 * | 9/2011 | Khandekar et al. | 375/146 |
| 8,031,583 | B2 * | 10/2011 | Classon et al. | 370/208 |
| 8,031,652 | B2 * | 10/2011 | Fong | 370/322 |
| 2001/0033560 | A1 * | 10/2001 | Tong et al. | 370/337 |
| 2002/0028680 | A1 | 3/2002 | Jenkins et al. | |
| 2003/0231612 | A1 * | 12/2003 | Kim et al. | 370/342 |
| 2003/0235180 | A1 * | 12/2003 | Oprescu-Surcobe et al. | 370/348 |
| 2004/0017809 | A1 * | 1/2004 | Park | 370/390 |
| 2004/0081125 | A1 * | 4/2004 | Ranta-Aho et al. | 370/335 |
| 2004/0136349 | A1 * | 7/2004 | Walton et al. | 370/338 |
| 2004/0184438 | A1 * | 9/2004 | Terry | 370/349 |
| 2004/0202140 | A1 * | 10/2004 | Kim et al. | 370/335 |
| 2005/0058089 | A1 | 3/2005 | Vijayan et al. | |
| 2005/0090278 | A1 * | 4/2005 | Jeong et al. | 455/525 |
| 2005/0122928 | A1 * | 6/2005 | Vijayan et al. | 370/312 |
| 2005/0147127 | A1 * | 7/2005 | Putcha et al. | 370/480 |
| 2005/0175070 | A1 * | 8/2005 | Grob et al. | 375/141 |
| 2005/0201407 | A1 * | 9/2005 | Kim et al. | 370/432 |
| 2005/0233760 | A1 * | 10/2005 | Voltolina et al. | 455/503 |
| 2005/0272459 | A1 * | 12/2005 | Lee et al. | 455/522 |
| 2005/0286472 | A1 * | 12/2005 | Lee et al. | 370/331 |
| 2006/0009200 | A1 * | 1/2006 | Jung et al. | 455/414.1 |
| 2006/0023664 | A1 * | 2/2006 | Jeong et al. | 370/329 |
| 2006/0030342 | A1 * | 2/2006 | Hwang et al. | 455/466 |
| 2006/0067281 | A1 * | 3/2006 | Kwak et al. | 370/337 |
| 2006/0067422 | A1 * | 3/2006 | Chung | 375/295 |
| 2006/0098567 | A1 * | 5/2006 | Willenegger et al. | 370/206 |
| 2006/0135074 | A1 * | 6/2006 | Petrovic et al. | 455/67.13 |
| 2006/0250940 | A1 * | 11/2006 | Tirkkonen et al. | 370/208 |
| 2006/0285483 | A1 * | 12/2006 | Khan | 370/208 |
| 2007/0030830 | A1 * | 2/2007 | Sagne et al. | 370/336 |
| 2007/0058595 | A1 * | 3/2007 | Classon et al. | 370/337 |
| 2007/0064655 | A1 * | 3/2007 | Ruuska | 370/332 |
| 2007/0067818 | A1 * | 3/2007 | Hjelm | 725/110 |
| 2007/0217350 | A1 * | 9/2007 | Sagne et al. | 370/310.2 |
| 2009/0022080 | A1 * | 1/2009 | Edlund et al. | 370/315 |
| 2009/0023438 | A1 * | 1/2009 | Breuer et al. | 455/423 |
| 2009/0028258 | A1 * | 1/2009 | Ma et al. | 375/260 |

FOREIGN PATENT DOCUMENTS

| | | |
|---|---|---|
| CN | 1592405 | 3/2005 |
| CN | 1604646 | 4/2005 |
| EP | 1267537 A2 | 12/2002 |
| KR | 10-2004-0055548 | 6/2004 |
| WO | 2005/020490 | 3/2005 |
| WO | 2005/122425 | 12/2005 |

OTHER PUBLICATIONS

Kallgren, D.G. et al. "IP unicast/multicast operation over STANAG 5066," IEEE Military Coimmunications Conference 2001 (MILCOM 2001); vol. 1, Oct. 28-31, 2001.

Korean Intellectual Property Office Application No. 10-2006-0021340, Notice of Allowance dated Dec. 28, 2012, 2 pages.

* cited by examiner

☐ Pilot  ☐ Unicast data  ☐ Multicast/Broadcast data

☐ Pilot  ☐ Unicast data  ☐ Multicast/Broadcast data

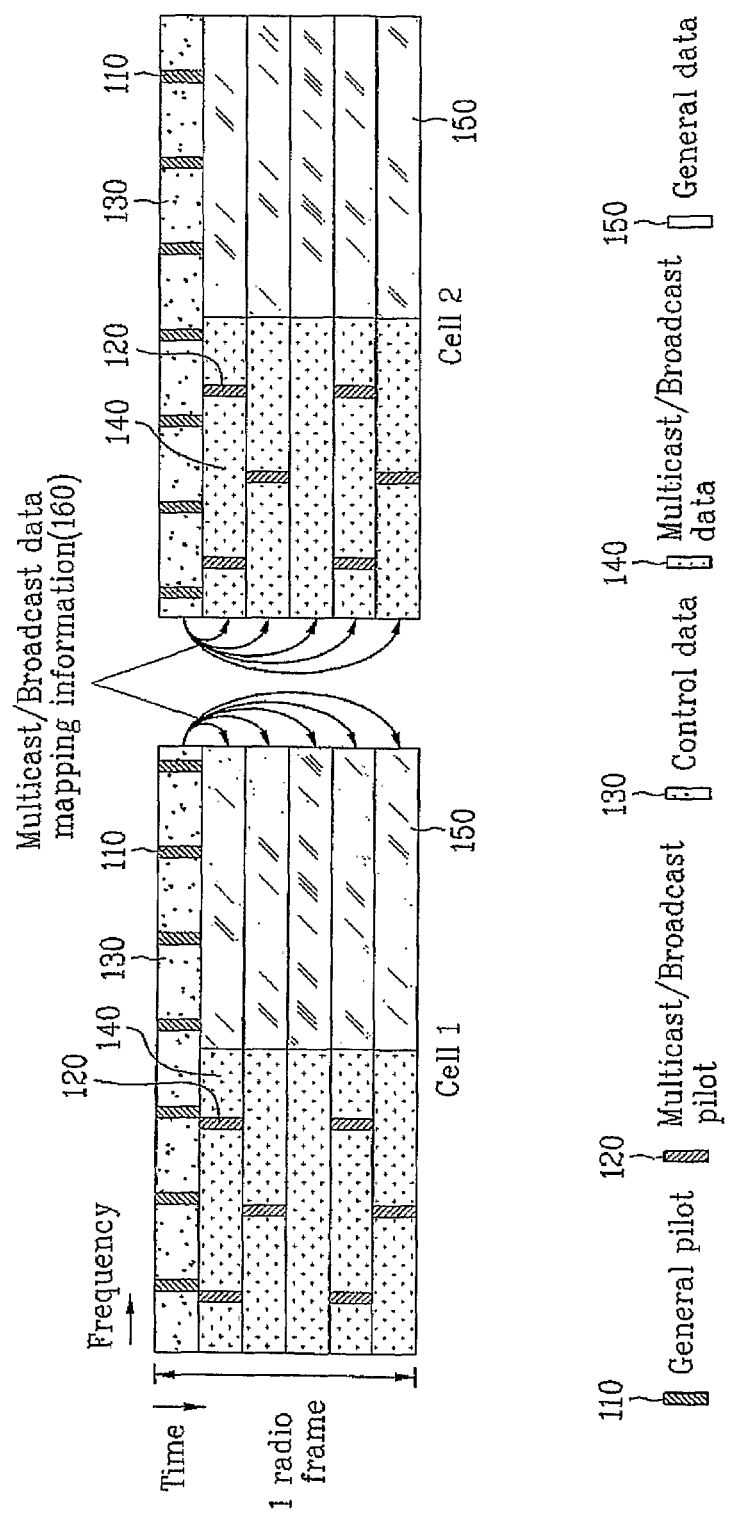

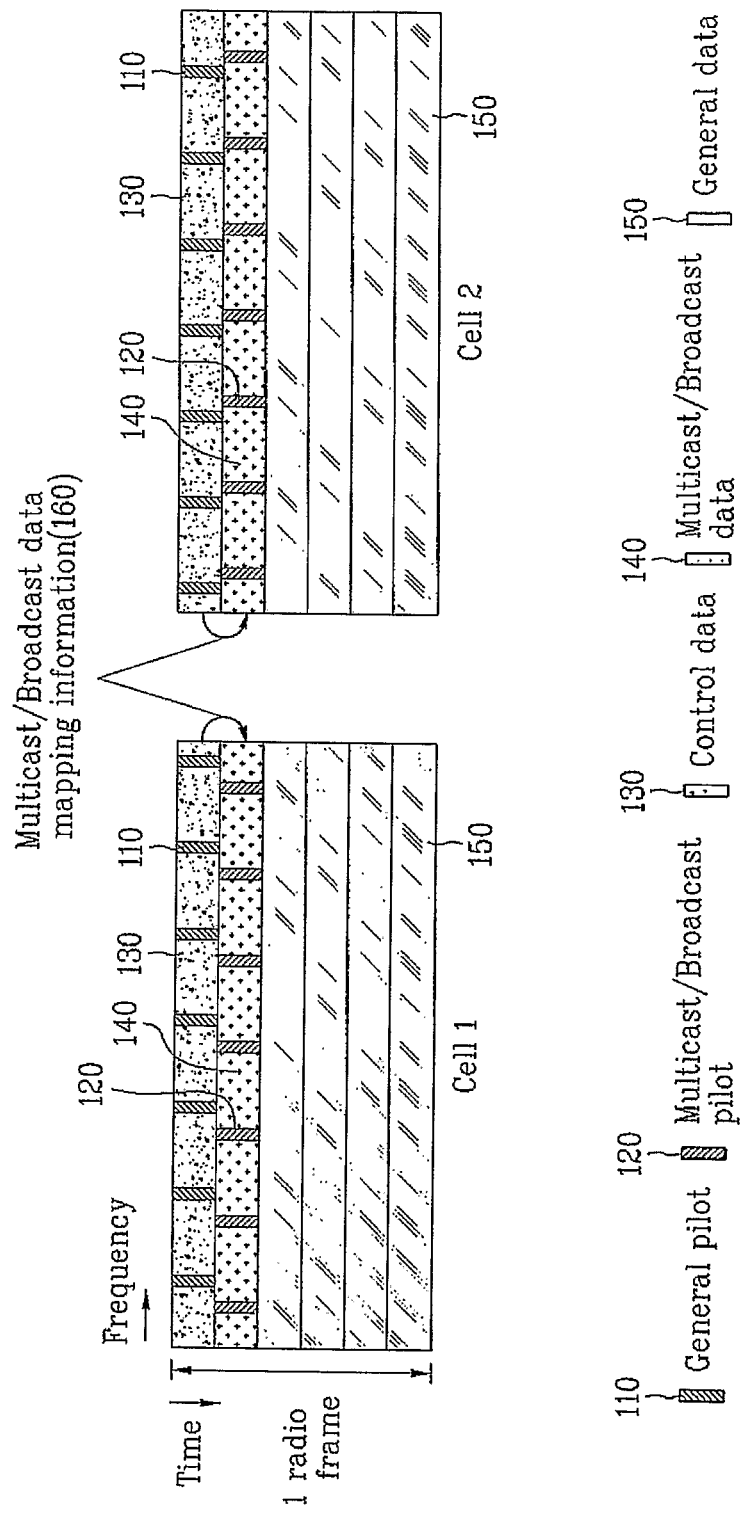

METHOD FOR TRANSMITTING AND RECEIVING DATA USING A PLURALITY OF CARRIERS

CROSS-REFERENCE TO RELATED APPLICATIONS

This application is the National Stage filing under 35 U.S.C. 371 of International Application No. PCT/KR2006/003936, filed on Sep. 29, 2006, which claims the benefit of earlier filing date and right of priority to Korean Application Nos. 10-2006-0021340, filed on Mar. 7, 2006, 10-2005-0114753, filed on Nov. 29, 2005, and 10-2005-0103503, filed on Oct. 31, 2005, and also claims the benefit of U.S. Provisional Application Ser. No. 60/722,539, filed on Sep. 30, 2005.

TECHNICAL FIELD

The present invention relates generally to any communications system using a multi-carrier transmission scheme, and more particularly, to methods for multiplexing multicast/broadcast data with unicast data and methods for combining the multiplexed data.

BACKGROUND ART

Heretofore, a plurality of cells transmit the same multicast/broadcast data to a plurality of terminals in downlink (or forward link) and each cell transmits unicast data to a designated terminal.

By effectively designing a receiver, the terminal can get higher receiving power and higher multi-cell diversity gain by combining and demodulating the same data from the plurality of cells. When receiving the multicast/broadcast data and the unicast data simultaneously, the terminal should be able to distinguish each data.

Therefore, it is desired to develop a method for effectively multiplexing the multicast/broadcast data and unicast data to minimize the waste of the frequency-time resources, and a method for mapping pilot/data to maximize multi-cell diversity gain.

DISCLOSURE OF INVENTION

Accordingly, the present invention is directed to a method for transmitting and receiving data using a plurality of carriers that substantially obviates one or more problems due to limitations and disadvantages of the related art.

An object of the present invention is to provide a method for effectively multiplexing the multicast/broadcast data and unicast data to minimize the waste of the frequency-time resources.

Another object of the present invention is to provide a method for mapping pilot/data to maximize multi-cell diversity gain.

Another object of the present invention is to provide a method for scheduling the multicast/broadcast data.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting data includes multiplexing the multicast/broadcast data and the unicast data in a frame and attaching a pilot signal to the frame.

In another aspect of the present invention, a method for manipulating a radio frame to be transmitted by a plurality of carriers includes receiving the radio frame including a plurality of data symbols multiplexed multicast/broadcast data with unicast data and retrieving the multicast/broadcast data and the unicast data from the radio frame.

It is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings;

FIG. 5A illustrates an example of a radio frame according to the present invention;

FIG. 5B illustrates another example of a radio frame according to the present invention;

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

The word "exemplary" is used herein to mean "serving as an example, instance, or illustration." Any embodiment described herein as "exemplary" is not necessarily to be construed as preferred or advantageous over other embodiments.

A base station is generally a fixed station that communicates with the terminals and may also be called a Node B, an access point, a base transceiver subsystem (BTS), or some other terminology. Each base station provides communication coverage for a particular geographic area. The term "cell" can refer to a base station and/or its coverage area depending on the context in which the term is used. Terminals may be dispersed throughout the system.

A terminal may be fixed or mobile and may also be called a mobile station, a wireless device, a user equipment (UE), a user terminal, a subscriber unit, or some other terminology. The terms "terminal" and "user" are used interchangeably herein. A terminal may communicate with zero, one, or multiple base stations on the downlink and/or uplink at any given moment. The downlink (or forward link) refers to the communication link from the base stations to the terminals, and the uplink (or reverse link) refers to the communication link from the terminals to the base stations.

The transmission techniques described herein may be used for various radio technologies such as Orthogonal Frequency Division Multiplexing (OFDM), Interleaved FDMA (IFDMA) (which is also called Distributed FDMA), and Localized FDMA (LFDMA) (which is also called Narrowband FDMA or Classical FDMA).

OFDM, IFDMA, and LFDMA are multi-carrier radio technologies that effectively partition the overall system bandwidth into multiple (S) orthogonal frequency subbands. These subbands are also called tones, subcarriers, bins, and frequency channels. Each subband is associated with a respective subcarrier that may be modulated with data. OFDM transmits modulation symbols in the frequency domain on all or a subset of the S subbands. IFDMA transmits modulation symbols in the time domain on subbands that are uniformly distributed across the S subbands. LFDMA transmits modulation symbols in the time domain and typically on adjacent subbands. The use of OFDM for unicast, multicast, and broadcast transmissions may also be considered as different radio technologies. The list of radio technologies given above is not exhaustive, and the transmission techniques may also be used for other radio technologies not mentioned above.

1. Multiplexing the Multicast/Broadcast Data With the Unicast Data

Figure 1:
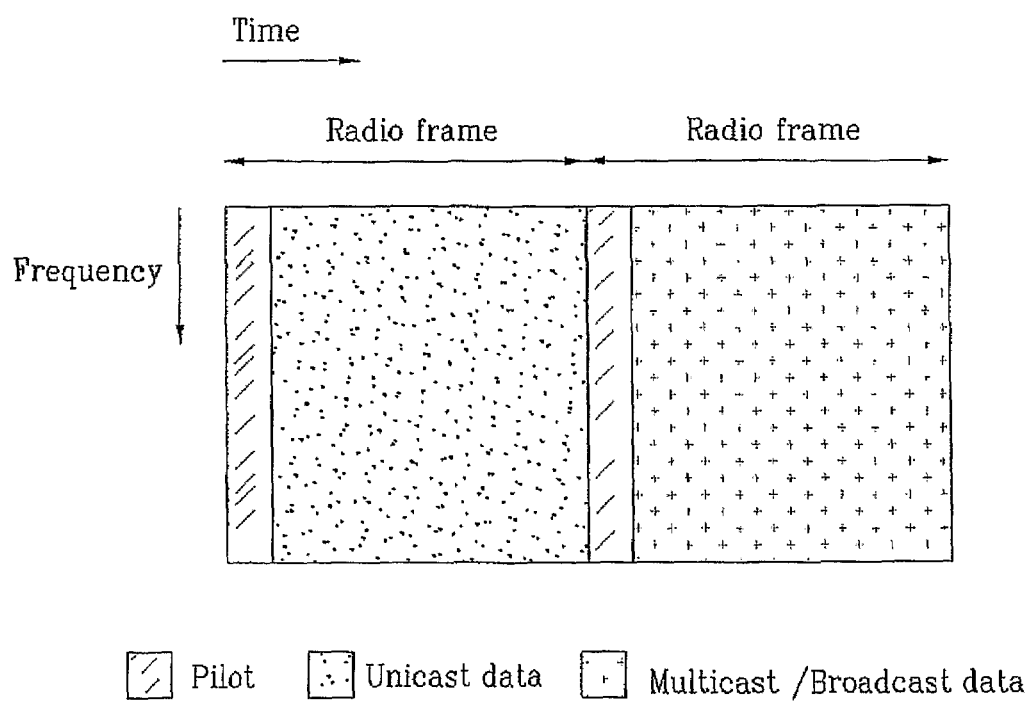
FIG. 1 illustrates a radio frame structure which multicast/broadcast data and unicast data are transmitted separately.

There are two methods of multiplexing multicast/broadcast data with unicast data. The first method is that multicast/broadcast data and unicast data are transmitted separately through each radio frame as shown in FIG. 1. In other words, a specific radio frame transmits only one of multicast/broadcast data and unicast data. A terminal receives the specific radio frame, and combines data from the specific radio frame by the RF (Radio Frequency) combining method. More explanation for the RF combining method will be followed later. The one of main advantages of the first method is a relatively simple algorithm to implement because each radio frame carries only one kind of data.

The second method is that multicast/broadcast data are transmitted through the same radio frame with different multiplexings such as FDM (Frequency Division Multiplexing), TDM (Time Division Multiplexing), or FTDM (Frequency-Time Division Multiplexing) as shown in FIG. 2.

Figure 2A:
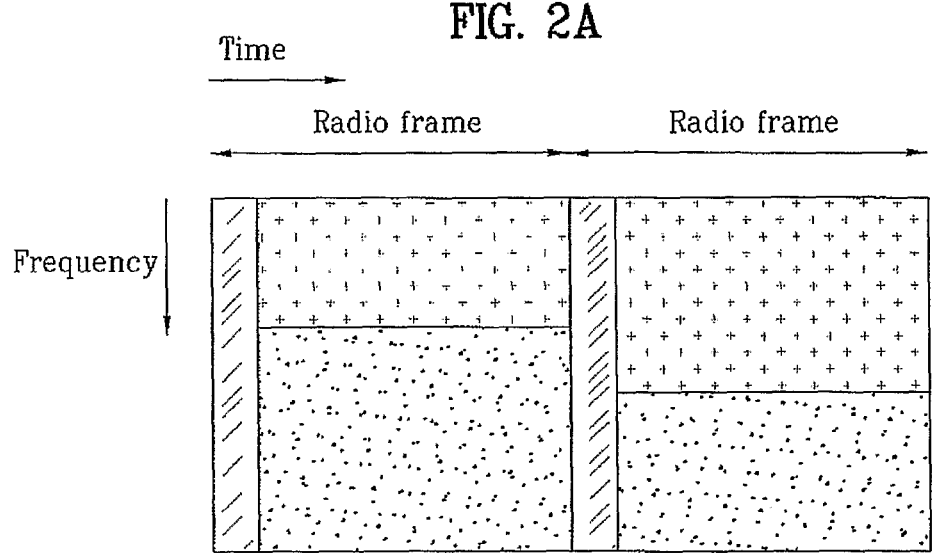
FIG. 2A illustrates a radio frame structure which is frequency division multiplexed (FDM) multicast/broadcast data with unicast data.
Figure 3A:
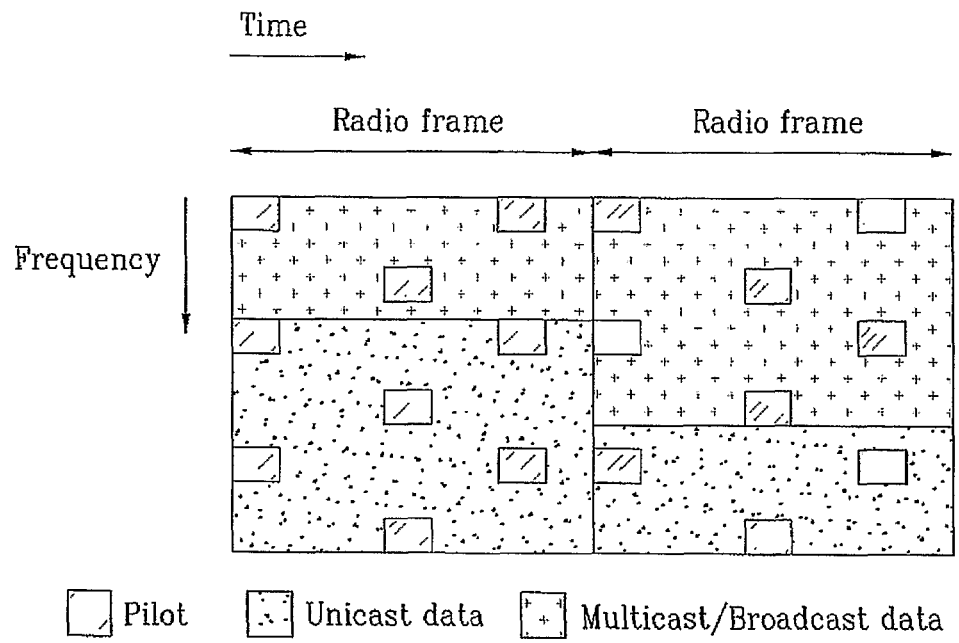
FIG. 3A illustrates a radio frame structure shown in FIG. 2A with the scattered (frequency-time hopped) pilot signal.

FIG. 2A shows radio frames FDM multiplexed multicast/broadcast data with unicast data. Furthermore, it is desirable to transmit radio frames with pilot signals. Pilot signals make terminals possible to perform channel estimations by transmitting predetermined signals between the mobile communications network and the terminal. By receiving the pilot signal, the terminal performs the channel estimation for the multicast/broadcast data from a plurality of cells and demodulates the received data by performing the RF combining. Even though the FIG. 2A shows that the pilot signal is located in the first OFDM symbol of the radio frame, the pilot signal can be anywhere in the radio frame. According to the present invention, the location of the pilot signal is not limited in the frequency domain or the time domain. Any OFDM symbol, or even one subcarrier in the OFDM symbol, can carry the pilot signal. FIG. 3A shows a radio frame structure of the above explained FDM example. As shown in the FIG. 3A, the pilot signal can be located at various time-frequency areas. In the FDM method, the multicast/broadcast data and the unicast data are transmitted at different frequency bands.

Figure 2B:
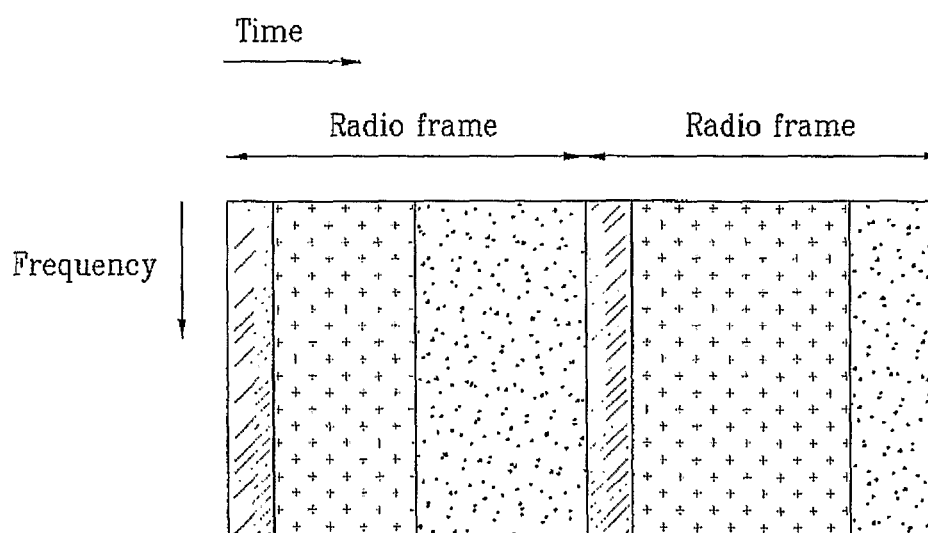
FIG. 2B illustrates a radio frame structure which is time division multiplexed (TDM) multicast/broadcast data with unicast data.
Figure 3B:
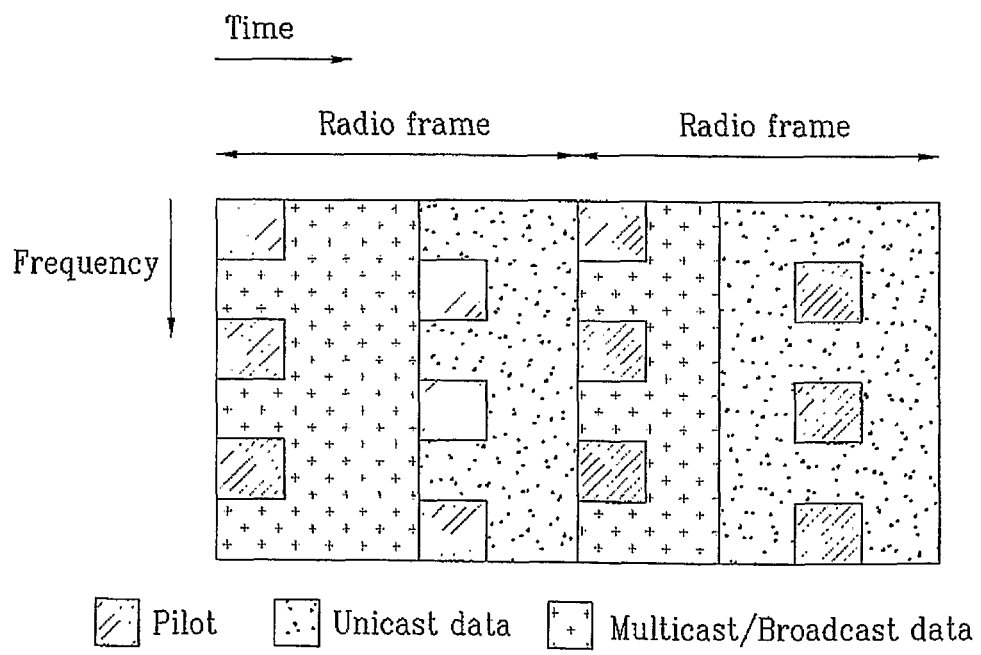
FIG. 3B illustrates a radio frame structure shown in FIG. 2B with the scattered (frequency-time hopped) pilot signal.

FIG. 2B shows radio frames TDM multiplexed multicast/broadcast data with unicast data. Furthermore, it is desirable to transmit radio frames with pilot signals. Pilot signals make terminals possible to perform channel estimations by transmitting predetermined signals between the mobile communications network and the terminal. By receiving the pilot signal, the terminal performs the channel estimation for the multicast/broadcast data from a plurality of cells and demodulates the received data by performing the RF combining. Even though the FIG. 2B shows that the pilot signal is located in the first OFDM symbol of the radio frame, the pilot signal can be anywhere in the radio frame. According to the present invention, the location of the pilot signal is not limited in the frequency domain or the time domain. Any OFDM symbol, or even a subcarrier of in the OFDM symbol, can carry the pilot signal. FIG. 3B shows a radio frame structure of the above explained TDM example. As shown in the FIG. 3B, pilot signals can be located at various time-frequency areas. In the TDM method, the multicast/broadcast data and the unicast data are transmitted at different times.

Figure 2C:
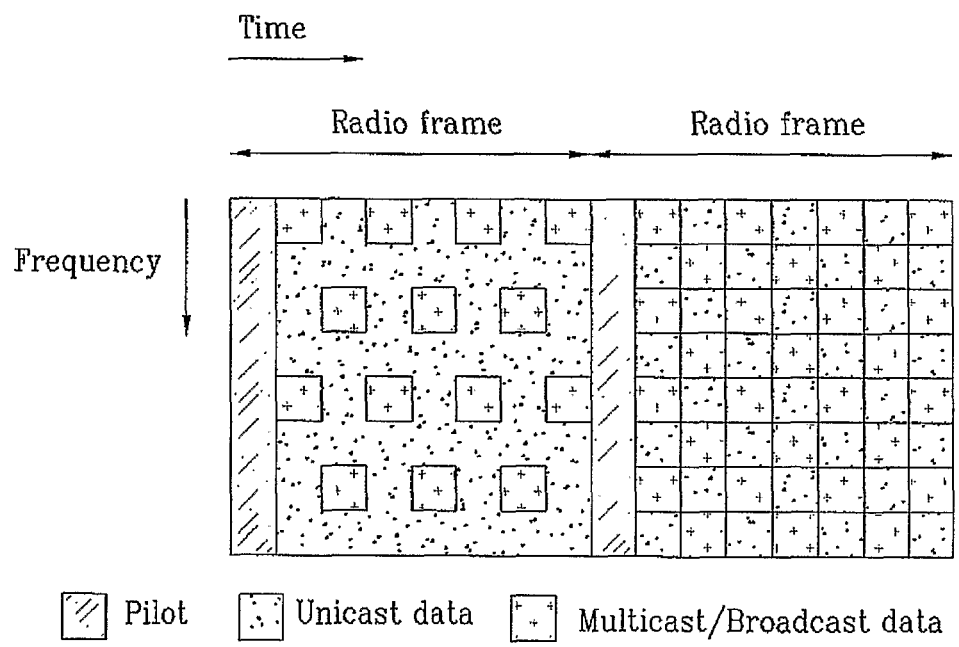
FIG. 2C illustrates a radio frame structure which is frequency-time division multiplexed (FTDM) multicast/broadcast data with unicast data.
Figure 3C:
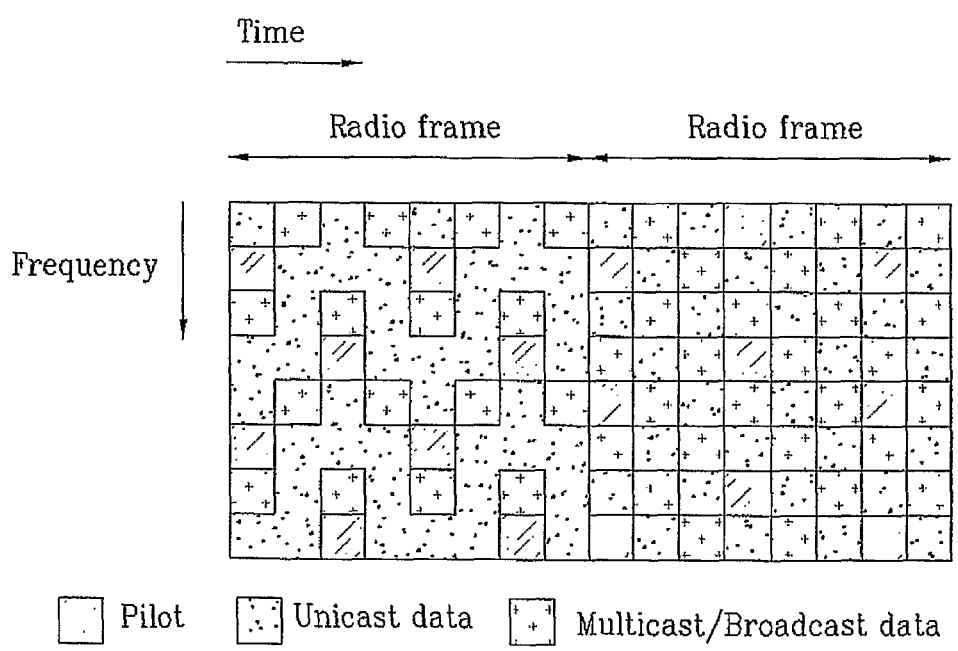
FIG. 3C illustrates a radio frame structure shown in FIG. 2C with the scattered (frequency-time hopped) pilot signal.

FIG. 2C shows radio frames frequency-time division multiplexed (FTDM) multicast/broadcast data with unicast data. Since the multicast/broadcast data and the unicast data are transmitted by specific frequency-time area, the multiplexing method of FIG. 2C is a kind of "hopping" methods. The frequency-time diversity can be acquired by properly controlling the hopping pattern. As in FIGS. 2A and 2B, it is also desirable to transmit the hopping types of radio frames with pilot signals. Pilot signals make terminals possible to perform channel estimations by transmitting predetermined signals between the mobile communications network and the terminal. By receiving the pilot signal, the terminal performs the channel estimation for the multicast/broadcast data from a plurality of cells and demodulates the received data by performing the RF combining. Even though the FIG. 2C shows that the pilot signal is located in the first OFDM symbol of the radio frame, the pilot signal can be anywhere in the radio frame. According to the present invention, the location of the pilot signal is not limited in the frequency domain or the time domain. Any OFDM symbol, or even one subcarrier of in the OFDM symbol, can carry the pilot signal. The FIG. 3C shows a radio frame structure of the above explained "hopping" example. In the frequency-time hopping method, the multicast/broadcast data and the unicast data are transmitted at different frequencies and different times.

Figure 4A:
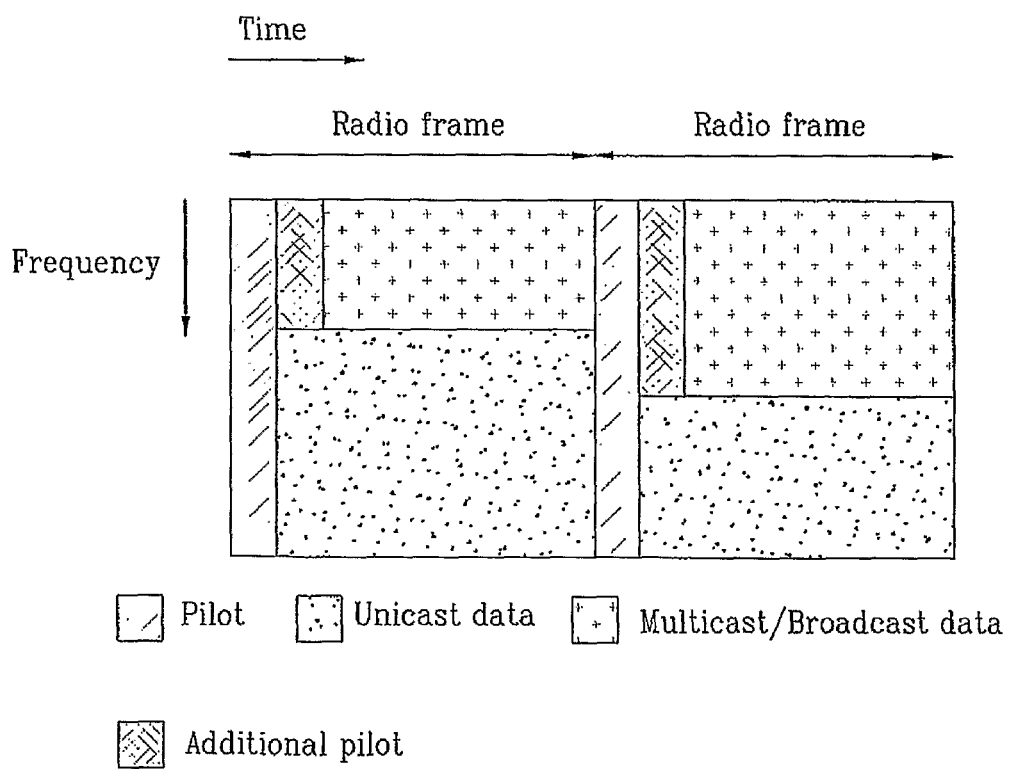
FIG. 4A illustrates a radio frame structure according to the FDM method with two pilot signals.
Figure 4B:
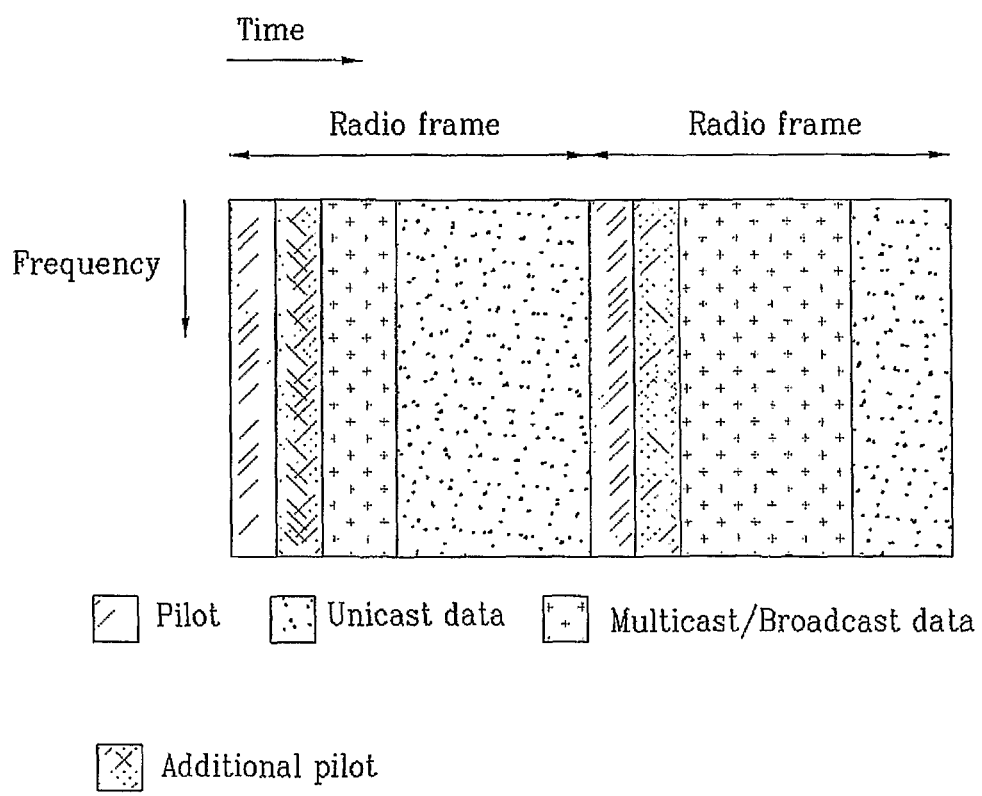
FIG. 4B illustrates a radio frame structure according to the TDM method with two pilot signals.

The TDM, FDM, and FTDM methods explained above have greater flexibility than the method of FIG. 1. Specially, the FDM has additional advantages. FIG. 4B shows a radio frame structure according to the TDM method. If an additional pilot is used for the RF combining of multicast/broadcast data in addition to the pilot signal for the unicast data, the TDM method requires adding the pilot signal to over a whole frequency band since multicast/broadcast data is transmitted via whole frequency band. The pilot signal does not necessarily being included in the specific OFDM symbols (the first and the second OFDM symbols in the FIG. 4B) or every subcarrier. Nonetheless, it is desirable to be distributed to all the subcarriers to acquire precise channel estimation and data modulation. Thus, the TDM method requires the pilot signal to be distributed to broad frequency range.

However, the FDM method has additional advantages regarding the pilot signal compared to other methods. FIG. 4A shows a radio frame structure according to the FDM method with two pilot signals. If an additional pilot signal is used for the multicast/broadcast data in addition to the pilot signal for the unicast data, the FDM method requires adding the additional pilot signal to only frequency band which transmits the multicast/broadcast data. Therefore, relative small pilot signal overhead is needed to effectively demodulate the multicast/broadcast data in the FDM method.

Figure 4C:
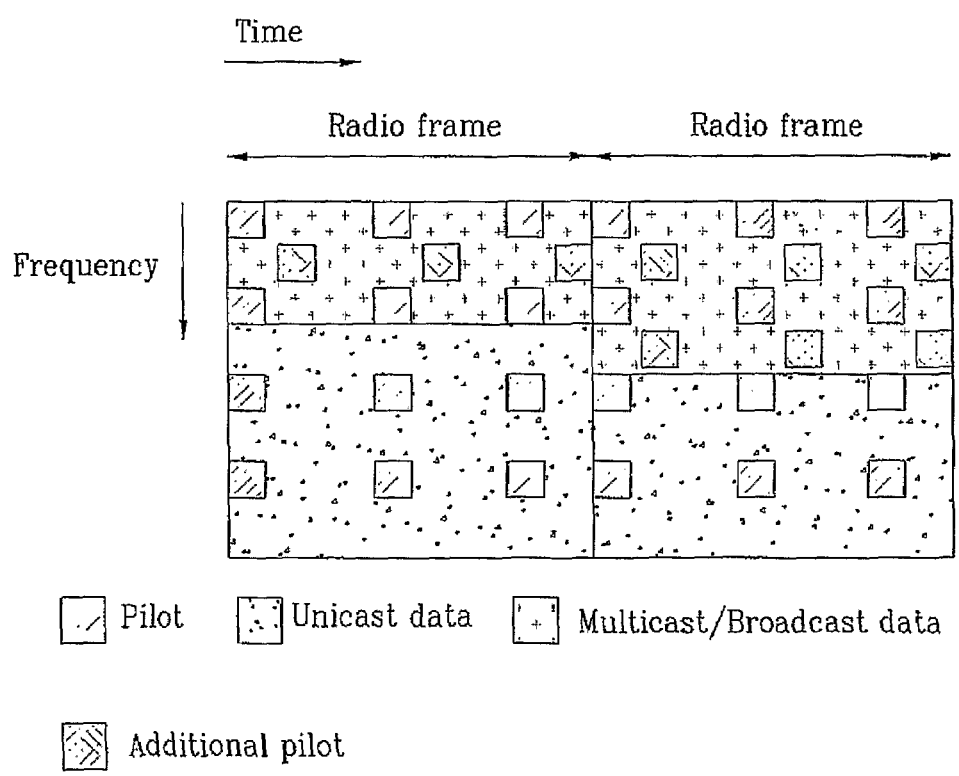
FIG. 4C illustrates a radio frame structure according to the FDM method with two scattered pilot signals.
Figure 4D:
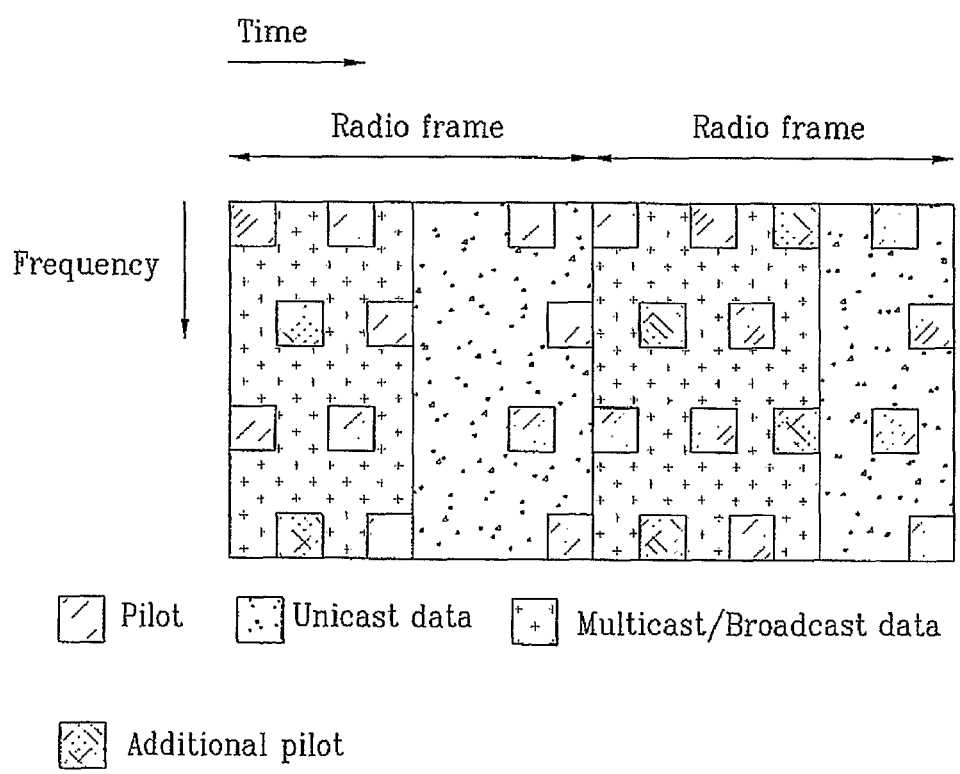
FIG. 4D illustrates a radio frame structure according to the TDM method with two scattered pilot signals.

The channel distortion is small during transmitting a radio frame since the radio frame is a relatively small time unit. Even though the pilot signal can be added to a specific OFDM symbol as shown in FIGS. 4A & 4B, the present invention is not limited to examples shown. In other words, the radio frame may include a pilot signal in various frequency-time areas. FIGS. 4C & 4D show pilot signals in various locations. In particular, the additional pilot signal may be provided for combining multicast/broadcast data in the frequency-time areas that are transmitted the multicast/broadcast data. It is also not limited for the additional pilot signal to be located at a specific area. Accordingly, all kinds of pilot signal locations are possible as shown in FIGS. 4C & 4D. Furthermore, the multicast/broadcast pilot signal may be located at some of general pilot signal areas.

2. The Scheduling of Multicast/Broadcast Data

The present invention discloses scheduling methods for radio frames transmitting multicast/broadcast data. Here, the term of "a radio frame transmitting multicast/broadcast data" means a radio frame transmitting multicast/broadcast data multiplexed with/without unicast data.

The first method is that a radio frame transmitting multicast/broadcast data has a predetermined pattern. The pattern may be a periodic pattern in time domain or may follow a certain rule. The network let the terminal know the pattern in advance, so that the terminal receives multicast/broadcast data only in radio frames belonged to the predetermined pattern. This method has an advantage that the terminal does not need to check whether the multicast/broadcast data is in the radio frame, thereby saving the battery life.

In this method, the amount of multicast/broadcast data transmitted in the present radio frame or multiplexing is set semi-statically and the network informs terminals of that information periodically or when it's necessary via higher layer signaling.

The second method is that the network does not necessarily transmit multicast/broadcast data in the radio frames allotted in the predetermined pattern. Control information included in the present radio frame has the information whether the multicast/broadcast data were actually transmitted, the amount of multicast/broadcast data transmitted in the present radio frame or multiplexing information. The terminal reads the control information and receives particular multicast/broadcast data. Also, if an additional pilot signal is used in the radio frame transmitting the multicast/broadcast data for the demodulation of the multicast/broadcast data, the control information of the radio frame includes the information whether the additional pilot signal is used and/or a type of the additional pilot signal. It is possible to use the control information having the same or similar format and signaling structure with control information for unicast data. Anyhow, information on a terminal ID in control information for unicast data should be replaced by a multicast/broadcast service ID in this case.

The third method is that the network transmits multicast/broadcast data in an arbitrary radio frame when needed. In this method, because the terminal may not know in any way which radio frame has the multicast/broadcast data, the terminal receives control information of each radio frame and checks whether the radio frame includes multicast/broadcast data. Control information included in the present radio frame also has the information whether the multicast/broadcast data were actually transmitted, the amount of multicast/broadcast data transmitted in the present radio frame or multiplexing information. The terminal reads the control information and receives particular multicast/broadcast data. Also, if an additional pilot signal is used in the radio frame transmitting the multicast/broadcast data for the demodulation of the multicast/broadcast data, the control information of the radio frame includes the information whether the additional pilot signal is used and/or a type of the additional pilot signal. It is possible to use the control information having the same or similar format and signaling structure with control information for unicast data. Anyhow, information on a terminal ID in control information for unicast data should be replaced by a multicast/broadcast service ID in this case.

3. Demodulation at a Mobile Terminal When More Than Two Different Lengths of Cyclic Prefixes Are Used OFDM symbols in radio frames transmitting multicast/broadcast data may have different cyclic prefix lengths than those of OFDM symbols in radio frames transmitting only unicast data.

The first method is that the first OFDM symbol in every frame has the same cyclic prefix length and the rest of the OFDM symbols in the frame have a variable length. The first OFDM symbol has the information to represent cyclic prefix lengths of the rest of the OFDM symbols.

The second method is that the terminal assumes the cyclic prefix length of the first OFDM symbol as the shortest cyclic prefix length among possible cyclic prefix lengths. Even though the actual cyclic prefix length is longer than the shortest possible cyclic prefix length, the terminal can successfully demodulate the signal. However, the error rate may be higher than when the cyclic prefix length of the first OFDM symbol is estimated. If the first OFDM symbol is not received properly, the terminal assumes the cyclic prefix length of the first OFDM symbol as the next shortest cyclic prefix length among the possible cyclic prefix lengths and continues this process until the first OFDM symbol is received properly.

4. Multiple Cell Diversity

When a wireless mobile network using an Orthogonal Frequency Division Multiple Access (OFDMA) transmits multicast/broadcast data in downlink, a plurality of neighboring cells may transmit the same data. By designing a receiver which effectively combines and demodulates data from a plurality of cells, the terminal achieves higher power and higher multiple cell diversity gain. There are two combining methods which combine data from a plurality of cells, namely, RF combining method and Selective combining method.

In RF combining method, which is also often called as 'single frequency network (SFN)' combining method, each cell transmits the same modulation symbol in the same frequency-time area, and each pilot signal for demodulation also should be the same for every cell in the frequency-time area. In other words, at the receiving side, each data from the plurality of cells should be received in the same frequency-time area within an allowable error range. Thus, the transmitting synchronization should be achieved for every cell.

Therefore, the terminal does not need to separate signals from each cell. Rather, the terminal regards signals from each cell as signals from one cell via various different channel paths. By doing this, the terminal has an effect to add more diversity paths and gets higher diversity gain.

However, the pilot signal for the demodulation of data transmitted to the terminal in the cell should have a different pilot signal structure in order to avoid interference in the frequency-time area.

Thus, the present invention includes an additional pilot signal (hereinafter refer to a multicast/broadcast pilot) for the multicast/broadcast data in addition to the general pilot signal for the unicast data. The multicast/broadcast pilot should be located at the different frequency-time area than the general pilot of the cell or neighboring cells.

Generally, a pilot symbol to demodulate modulation symbols should be located near the modulation symbols in frequency-time areas. If the multicast/broadcast data and the unicast data are transmitted in the same radio frame and the modulation symbols of multicast/broadcast data are broadly distributed over one radio frame, too many pilot symbols may be needed to locate each one of pilot symbols near each modulation symbol.

FIG. 5A shows an example of a radio frame according to the present invention. One radio frame has a plurality of OFDM symbols. For example, the radio frame in FIG. 5A has 6 OFDM symbols. One OFDM symbol consists of a plurality of subcarriers. For instance, multicast/broadcast data (140) are transmitted by subcarriers in a certain frequency band as shown in FIG. 5A. The first OFDM symbol included in the radio frame comprises a general pilot (110) and control data (130). The locations of general pilots (110) are different for each cell. The mobile communications network transmits the first OFDM symbol with multicast/broadcast mapping information (160) to show, directly or in a certain rule, the location of the multicast/broadcast data. Since the multicast/broadcast data (140) are transmitted only in a certain frequency band, multicast/broadcast pilots (120) according to the multicast/broadcast data (140) are also transmitted by subcarriers only in a certain frequency band. The multicast/broadcast pilot (120) is located at the same place for each cell whereas the general pilot (110) transmitted by each cell can be usually located at the different place.

FIG. 5B shows another example of a radio frame according to the present invention. Like FIG. 5A, the radio frame in FIG. 5B has 6 OFDM symbols. However, the main difference between the FIG. 5A and FIG. 5B is that the multicast/broadcast data in FIG. 5B are transmitted on the second OFDM symbol in both cell 1 and cell 2 whereas the multicast/broadcast data in FIG. 5A are transmitted on the certain frequencies over whole frame time. Thus, the terminal acquires the multicast/broadcast data mapping information (160) through the first OFDM symbol and combines, using the RF combining method, the multicast/broadcast data (140) transmitted with the multicast/broadcast pilot (120). The multicast/broadcast data are not necessarily transmitted on the second OFDM symbol, but it is possible to be transmitted on third or later OFDM symbol.

Figure 6:
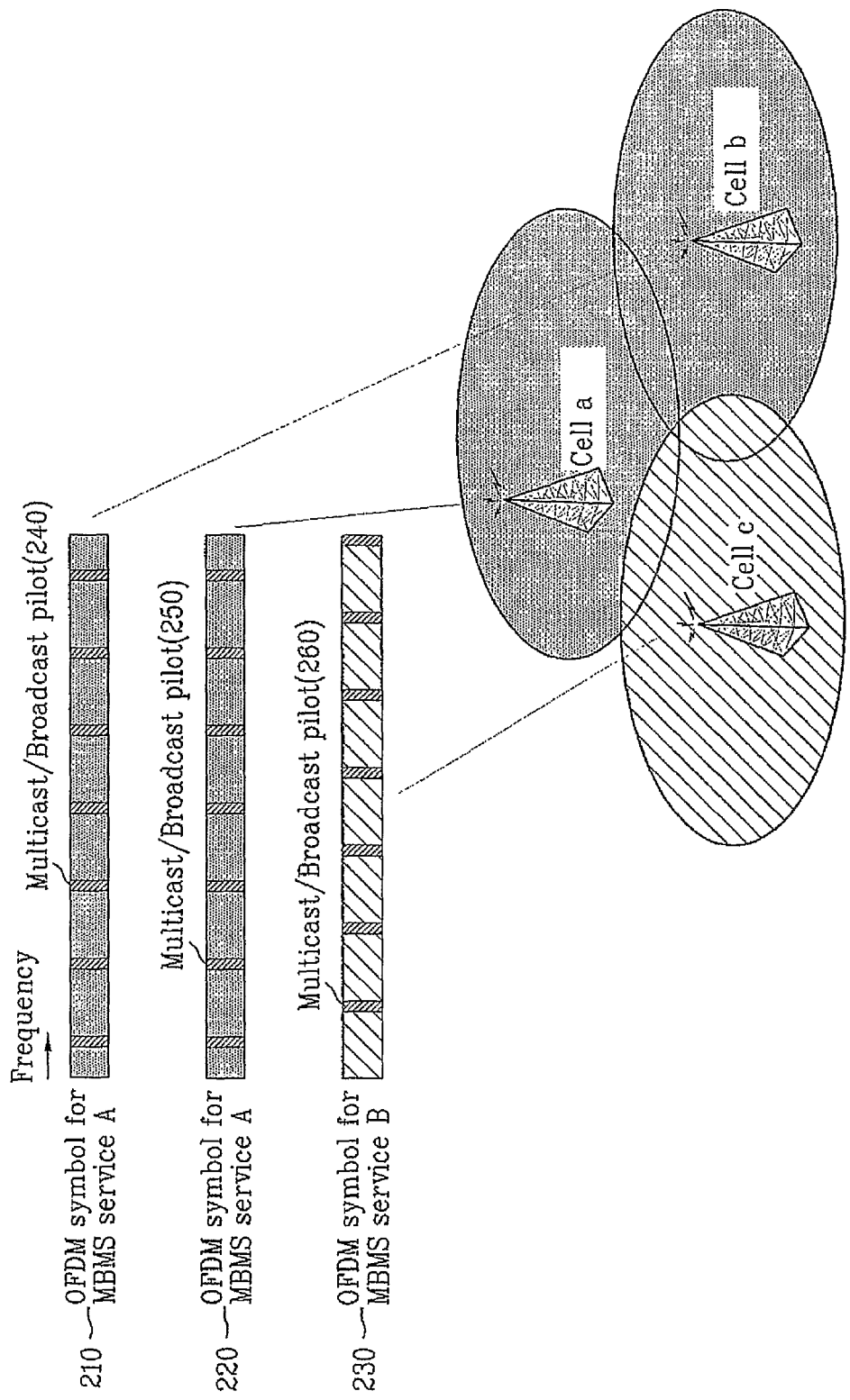
FIG. 6 illustrates OFDM symbols that each OFDM symbol from each cell carries different multicast/broadcast data.

FIG. 6 shows OFDM symbols that each OFDM symbol from each cell carries different multicast/broadcast data. Cell a and cell b transmit the first multicast/broadcast data at the same time whereas cell c transmits the second multicast/broadcast data different than the first multicast/broadcast data at the same time. Each OFDM symbol for cell a, b and c can be represented by 210, 220 and 230, respectively. Different multicast/broadcast pilot is transmitted for each multicast/broadcast data, thereby decreasing the interference. In this instance, the multicast/broadcast information transmitted with the first OFDM symbol includes the information indicating which kind of multicast/broadcast pilot is used for the cell.

In selective combining method, the terminal demodulates and decodes the same signal from each cell and determines by each cell that the reception is successful. Accordingly, even though only one reception from a plurality of cells is successful, the terminal's overall reception for the signal is successful, thereby increasing diversity gain. Thus, the multicast/broadcast pilot used in the RF combining method is not needed in the selective combining method. Only general pilot is needed to demodulate multicast/broadcast data and the unicast data. Accordingly, when the communications network supports the RF combining method, the multicast/broadcast pilot is transmitted, and when the communications network does not support the RF combining method, the multicast/broadcast pilot is not transmitted. Moreover, a cell notifies all terminals in the cell whether the communication network supports the RF combining method or the selective combining method, that is, whether the cell transmits a multicast/broadcast pilot for the multicast/broadcast data. Each terminal utilizes a multicast/broadcast pilot when the RF combining method is supported or a general pilot when the RF combining method is not supported to demodulate the multicast/broadcast data.

Figure 7:
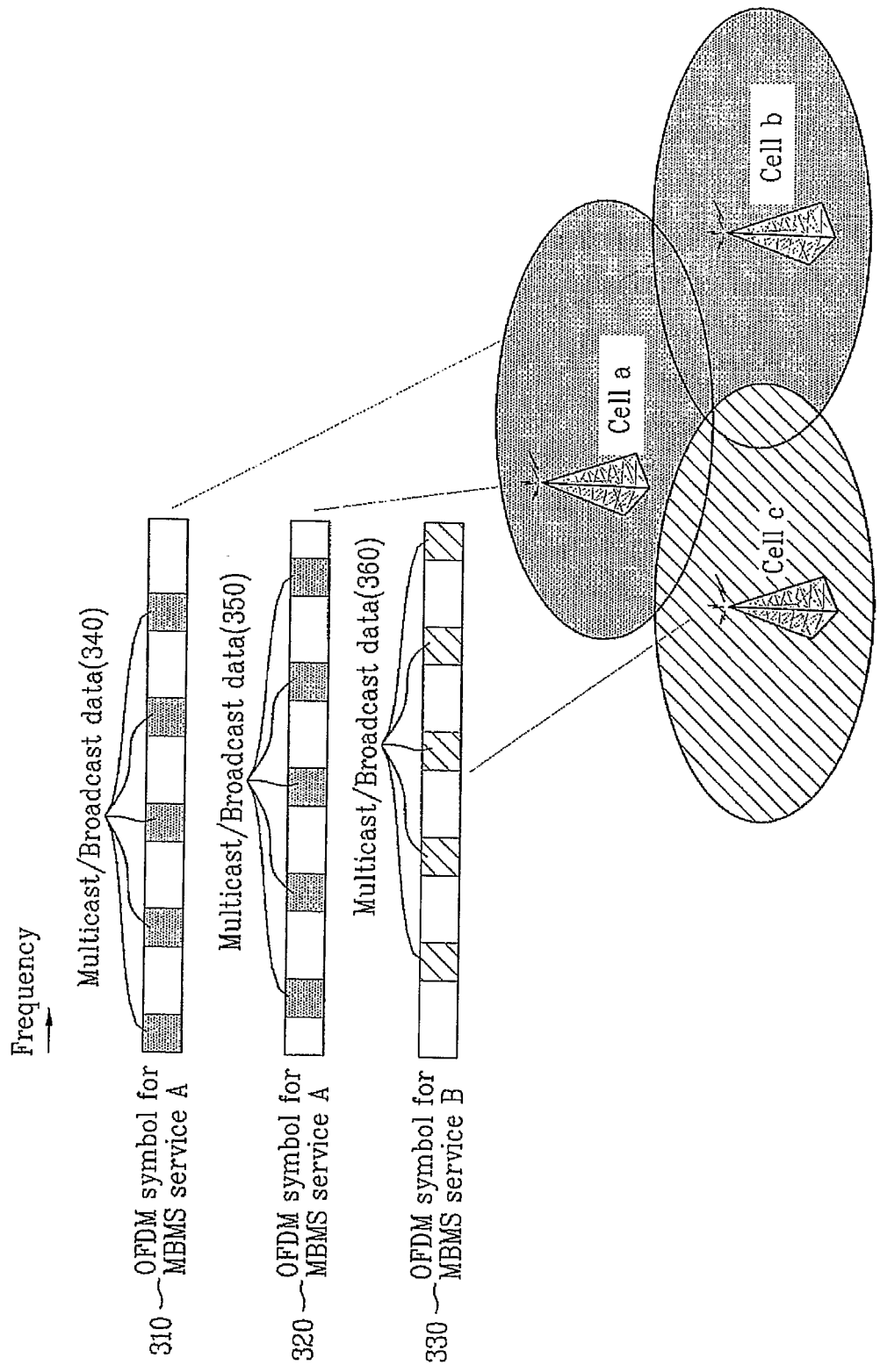
FIG. 7 illustrates OFDM symbols that each OFDM symbol from each cell carries the same multicast/broadcast data spreaded over the whole frequency band.

FIG. 7 shows that each OFDM symbol from each cell carries the same multicast/broadcast data spread over the whole frequency band. By spreading over the whole frequency band, frequency diversity may be increased. While cell a and cell b are in the same service area (service A), cell a and cell b transmit the same multicast/broadcast data. Also, while cell c is in the different service area (service B) than cell a and cell b, cell c transmits the different multicast/broadcast data than that of cell a and cell b. Cell a, cell b and cell c transmit an OFDM symbol 310, 320 and 330, respectively. It is not necessary that cell a and cell b transmit the same pilot. The same multicast/broadcast data are transmitted by cell a and cell b, but at different frequencies to avoid interferences.

Figure 8:
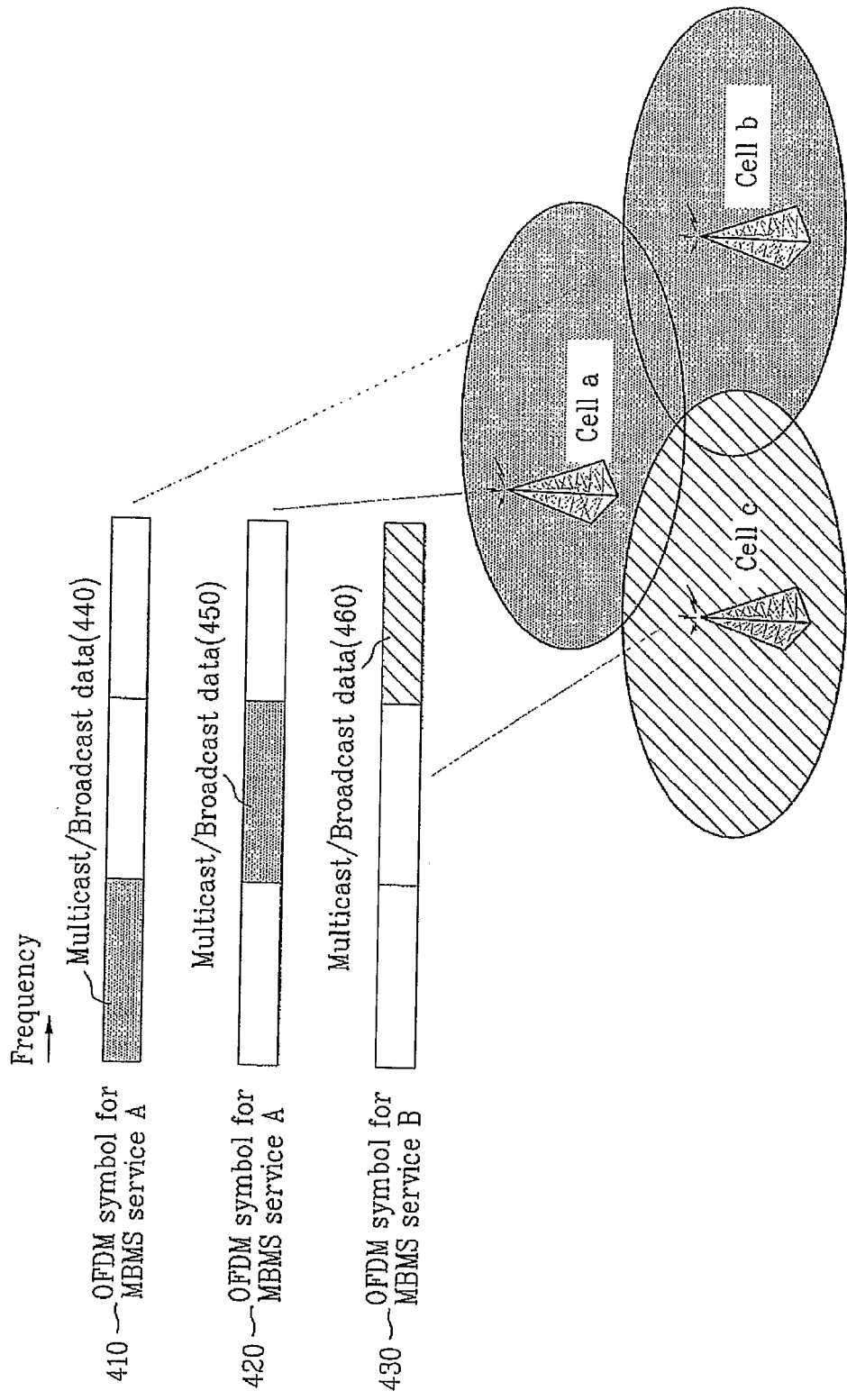
FIG. 8 illustrates OFDM symbols that each OFDM symbol from each cell carries the same multicast/broadcast data in specific frequencies.

FIG. 8 shows that each OFDM symbol from each cell carries the same multicast/broadcast data in specific frequencies. By transmitting the multicast/broadcast data in specific frequencies, the number of pilots may be decreased. Like FIG. 7, while cell a and cell b are in the same service area (service A), cell a and cell b transmit the same multicast/broadcast data. Also, while cell c is in the different service area (service B) than cell a and cell b, cell c transmits the different multicast/broadcast data than that of cell a and cell b. Cell a, cell b and cell c transmit an OFDM symbol 410, 420 and 430, respectively. It is not necessary that cell a and cell b transmit the same pilot. The same multicast/broadcast data are transmitted by cell a and cell b, but at different frequencies to avoid interferences.

Industrial Applicability

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A method for receiving multicast/broadcast data to be transmitted by a plurality of subcarriers, the method comprising:

receiving a transport format representing characteristics of a radio frames, wherein the transport format includes information on at least two of the following: a number of data symbols included in the radio frames, a length of a cyclic prefix transmitted with the plurality of data symbols or a type of the pilot signals;

receiving, from each of a plurality of cells, the radio frame including a plurality of data symbols, wherein the plurality of data symbols include multicast/broadcast data; and retrieving the multicast/broadcast data from the plurality of data symbols, wherein each of the plurality of data symbols includes the pilot signal for the multicast/broadcast data, wherein, if the plurality of cells transmit the same multicast/broadcast data at the same time, the same pilot signals are received at same frequencies in each of the plurality of data symbols, and wherein, if the plurality of cells transmit the different multicast/broadcast data at the same time, the different pilot signals are received at different frequencies in each of the plurality of data symbols, wherein a first data symbol of the plurality of data symbols received from each of the plurality of cells includes information indicating which kind of pilot signal is used.

2. The method of claim 1, wherein a cyclic prefix received with the first data symbol of the plurality of data symbols has a fixed length.

3. The method of claim 2, further comprising:

receiving, via the first data symbol, length information of the cyclic prefix.

* * * * *